US009627674B2

(12) United States Patent
Jeong et al.

(10) Patent No.: US 9,627,674 B2
(45) Date of Patent: Apr. 18, 2017

(54) BATTERY MODULE

(71) Applicant: SAMSUNG SDI CO., LTD., Yongin-si, Gyeonggi-do (KR)

(72) Inventors: Ik-Jae Jeong, Yongin-si (KR); Min-Cheol Bae, Yongin-si (KR); Kyoung-Hwan Noh, Yongin-si (KR); Ji-Ho Lee, Yongin-si (KR); Hong-Keun Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 31 days.

(21) Appl. No.: 14/632,640

(22) Filed: Feb. 26, 2015

(65) Prior Publication Data
US 2015/0270525 A1   Sep. 24, 2015

(30) Foreign Application Priority Data

Mar. 19, 2014   (KR) .................. 10-2014-0032080

(51) Int. Cl.
*H01M 2/22* (2006.01)
*H01M 2/20* (2006.01)
*H01M 2/10* (2006.01)
*H01R 4/02* (2006.01)
*H01R 11/28* (2006.01)

(52) U.S. Cl.
CPC ......... *H01M 2/202* (2013.01); *H01M 2/1016* (2013.01); *H01R 4/029* (2013.01); *H01R 11/288* (2013.01)

(58) Field of Classification Search
CPC ...... H01M 2/1016; H01M 2/202; H01M 2/30; H01R 4/06
See application file for complete search history.

(56) References Cited

U.S. PATENT DOCUMENTS

| 2003/0141842 | A1 | 7/2003 | Izawa et al. |
| 2011/0177381 | A1 | 7/2011 | Oya et al. |
| 2011/0287287 | A1* | 11/2011 | Kang ............... H01M 2/1077 429/82 |
| 2012/0288744 | A1* | 11/2012 | Guen ................. H01M 2/206 429/158 |

FOREIGN PATENT DOCUMENTS

| KR | 2003-0066382 | 8/2003 |
| KR | 10-2011-0067027 | 6/2011 |

* cited by examiner

*Primary Examiner* — Cynthia K Walls
(74) *Attorney, Agent, or Firm* — Lewis Roca Rothgerber Christie LLP

(57) ABSTRACT

A battery module includes a plurality of battery cells, each including terminal portions on a first surface thereof, the plurality of battery cells being aligned in a first direction; and a terminal connecting member configured to connect terminal portions of first and second battery cells of the plurality of battery cells that are adjacent to each other, and the terminal connecting member includes first and second contact portions spaced apart from each other to respectively come in surface contact with the terminal portions of the first and second battery cells, and a body portion connecting the first and second contact portions to each other.

10 Claims, 6 Drawing Sheets

BATTERY MODULE

CROSS-REFERENCE TO RELATED APPLICATION

This application claims priority to and the benefit of Korean Patent Application No. 10-2014-0032080, filed on Mar. 19, 2014 in the Korean Intellectual Property Office, the entire content of which is incorporated herein by reference.

BACKGROUND

1. Field

Aspects of embodiments of the present invention relate to a battery module.

2. Description of the Related Art

As industries of electronics, communications and the like are rapidly developed, the spread of portable electronic devices such as a camcorder, a cellular phone and a notebook PC has recently been increased. Accordingly, the use of secondary batteries has also been increased. The secondary batteries can be used for not only portable electronic devices but also medium-and large-sized apparatuses, such as an electric tool, an automobile, a space transportation means, a motorbike, a motor scooter and an aerial transportation means, which require high output and high power. The secondary batteries used for the medium-and large-sized apparatuses constitute a large-capacity battery module or battery pack by connecting a plurality of battery cells in series or parallel.

A bus bar may be used to connect battery cells in series or parallel as described above. In this case, when the bus bar is welded or fastened to a terminal portion of the battery cell, a difference in height between adjacent battery cells may occur, and, therefore, welding may not be uniformly performed on the terminal portion of the battery cell. Accordingly, various studies on a method for overcoming a step difference between battery cells have been conducted.

SUMMARY

According to an aspect of embodiments of the present invention, a battery module includes a terminal connecting member provided with first and second contact portions respectively coming in surface contact with terminal portions.

According to another aspect of embodiments of the present invention, a battery module has a structure in which terminal portions of adjacent battery cells are closely connected to each other.

According to another aspect of embodiments of the present invention, a battery module includes at least one of a first or second contact portion provided with a slit portion to easily come in surface contact with a terminal.

According to another aspect of one or more embodiments of the present invention, a battery module includes a terminal contact portion having a thickness less than that of a first or second contact portion.

According to another aspect of one or more embodiments of the present invention, a battery module includes a terminal connecting member provided with a stepped portion enabling a step difference to be overcome.

According to one or more embodiments of the present invention, a battery module includes: a plurality of battery cells, each including terminal portions on a first surface thereof, the plurality of battery cells being aligned in a first direction; and a terminal connecting member configured to connect terminal portions of first and second battery cells of the plurality of battery cells that are adjacent to each other, and the terminal connecting member includes first and second contact portions spaced apart from each other to respectively come in surface contact with the terminal portions of the first and second battery cells, and a body portion connecting the first and second contact portions to each other.

The terminal connecting member may further include a slit portion including a pair of slits in at least one of the first or second contact portions.

In the slit portion, the pair of slits may be cut in parallel with a same length at a position corresponding to the terminal portion.

A terminal contact portion positioned between the pair of slits may have a thickness less than that of the first or second contact portion adjacent to the terminal contact portion.

The thickness of the terminal contact portion may decrease from a region adjacent to the body portion to an end portion of the terminal contact portion.

An upper surface of the terminal contact portion may be curved.

An upper surface of the terminal contact portion may be inclined.

The terminal connecting member and the terminal portion may be welded to each other at the slits by a laser beam.

The terminal connecting member may further include a stepped portion wherein a portion of the body portion is bent such that heights of the first and second contact portions are different from each other.

The terminal connecting member may further include a slit portion including two parallel slits and a connection slit connecting ends of the two parallel slits in at least one of the first or second contact portions.

The battery module may further include a housing configured to accommodate the plurality of battery cells therein. The housing may include a pair of end plates opposite to wide surfaces of outermost battery cells of the plurality of battery cells; a side plate configured to support side surfaces of the battery cells, the side plate connecting the pair of end plates to each other; and a bottom plate configured to support bottom surfaces of the battery cells.

The pair of end plates, the side plate, and the bottom plate may be connected by fastening members.

As described above, according to an aspect of embodiments of the present invention, in a battery module, terminal portions of adjacent battery cells are closely connected to each other by first and second contact portions, thereby improving the quality and safety of the battery module.

Further, terminals of adjacent battery cells can be closely coupled to each other through surface contact, thereby ensuring the safety of the battery module.

Further, the thickness of the terminal contact portion may be formed thinner than that of the first or second contact portion, such that it is possible to overcome a step difference between adjacent terminals with a small amount of force, thereby improving the efficiency of working.

Further, the stepped portion may be formed in the body portion, such that it is possible to overcome a step difference between the battery cells and thereby improve the safety of the battery module. In addition, the battery cells may be closely connected to one another, such that a high-capacity battery pack is provided, thereby contributing to industrialization.

BRIEF DESCRIPTION OF THE DRAWINGS

Some example embodiments of the present invention are described more fully hereinafter with reference to the accompanying drawings; however, the present invention may be embodied in different forms and should not be construed as limited to the embodiments set forth herein. Rather, the accompanying drawings, together with the specification, illustrate some example embodiments of the present invention, and serve to explain principles and aspects of the present invention.

In the drawing figures, dimensions may be exaggerated for clarity of illustration. Like reference numerals refer to like elements throughout.

DETAILED DESCRIPTION

Figure 1:
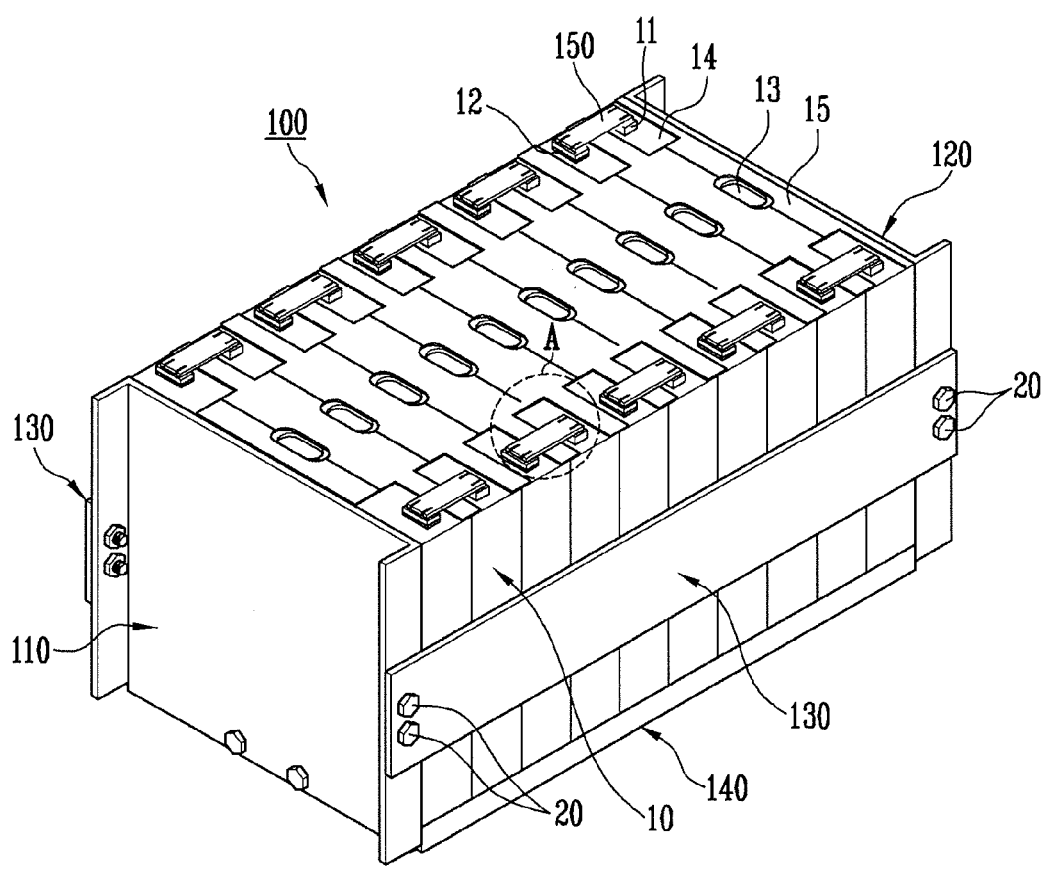
FIG. 1 is a perspective view of a battery module according to an embodiment of the present invention.

In the following detailed description, certain exemplary embodiments of the present invention are shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. It will be understood that when an element is referred to as being "between" two elements, it can be the only element between the two elements, or one or more intervening elements may also be present. In addition, when an element is referred to as being "on" another element, it can be directly on the another element or indirectly on the another element with one or more intervening elements interposed therebetween. Similarly, when an element is referred to as being "connected to" another element, it can be directly connected to the another element or indirectly connected to the another element with one or more intervening elements interposed therebetween. Hereinafter, like reference numerals refer to like elements.

Figure 2:
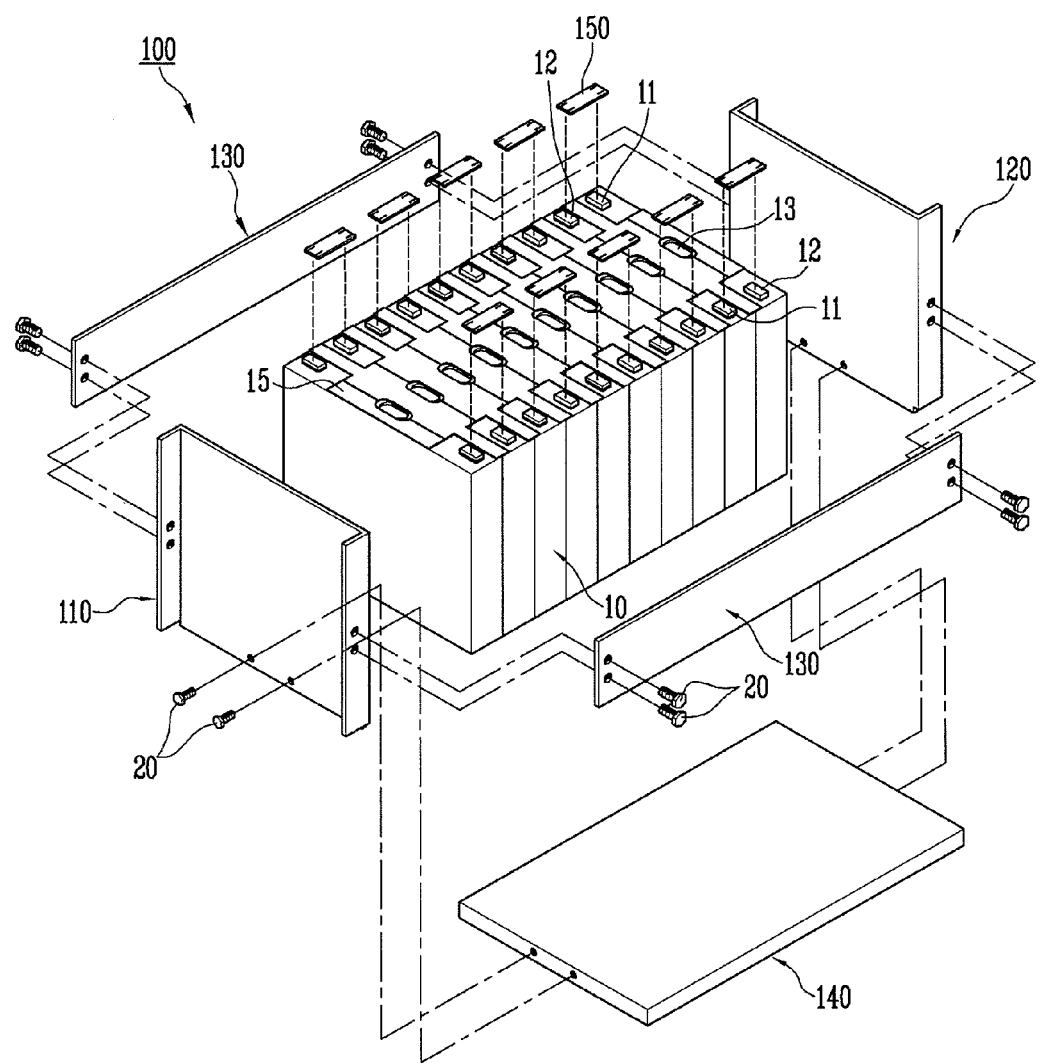
FIG. 2 is an exploded perspective view of the battery module of FIG. 1.

FIG. 1 is a perspective view of a battery module according to an embodiment of the present invention. FIG. 2 is an exploded perspective view of the battery module of FIG. 1.

Figure 3:
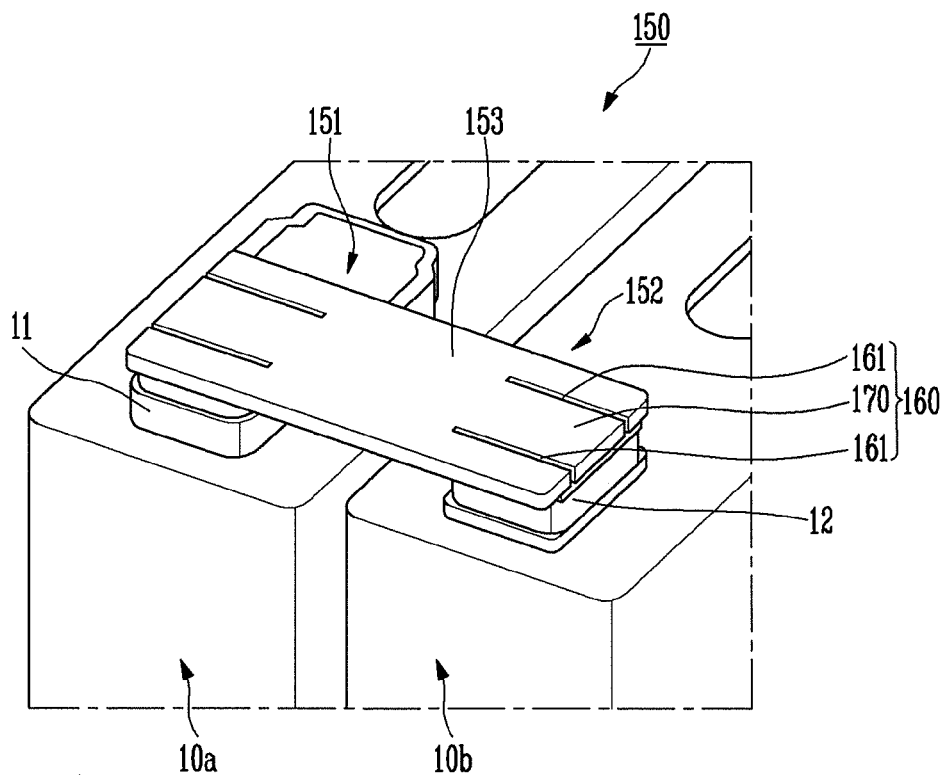
FIG. 3 is an enlarged perspective view of a region "A" of FIG. 1, showing a terminal connecting member of the battery module in a connection state, according to an embodiment of the present invention.

As shown in FIGS. 1 and 2, a battery module 100 according to an embodiment of the present invention includes a plurality of battery cells 10 each including terminal portions 11 and 12 on a first surface 14 thereof, the plurality of battery cells 10 being aligned in a first direction; a terminal connecting member 150 configured to connect terminal portions 11 and 12 of first and second battery cells 10 adjacent to each other; and a housing 110, 120, 130 and 140 configured to accommodate the plurality of battery cells 10 therein. As shown in FIG. 3, the terminal connecting member 150 includes first and second contact portions 151 and 152 spaced apart from each other to come in surface contact with the respective terminal portions 11 and 12, and a body portion 153 configured to connect the first and second contact portions 151 and 152 to each other.

The battery cell 10, in one embodiment, includes a battery case including the first surface 14, and an electrode assembly and an electrolyte accommodated in the battery case. The electrode assembly and the electrolyte electrochemically react with each other to generate energy. The first surface 14 may be provided with the terminal portions 11 and 12 electrically connected to the electrode assembly, and a vent 13 that is a path through which gas generated inside the battery cell 10 is exhausted. For example, the terminal portions 11 and 12 may be positive and negative electrode terminals 11 and 12 having different polarities from each other, and the terminal portions 11 and 12 of battery cells 10 adjacent to each other may be electrically connected in series or parallel by the terminal connecting member 150. In one embodiment, a gasket 15 made of an electrically insulating material may be provided on the first surface 14 of the battery cell 10, and the terminal portions 11 and 12 are protruded to the outside of the gasket 15 and may be connected by the terminal connecting member 150 on the gasket 15.

The plurality of battery cells 10 may be aligned in the first direction such that wide surfaces of the battery cells 10 face each other. The plurality of aligned battery cells 10 may be fixed by the housing 110, 120, 130 and 140. The housing 110, 120, 130 and 140, in one embodiment, may include a pair of end plates 110 and 120 configured to face the wide surfaces of outermost ones of the plurality of battery cells 10, and side and bottom plates 130 and 140 configured to connect the pair of end plates 110 and 120 to each other. The side plate 130 may support side surfaces of the battery cells 10, and the bottom plate 140 may support bottom surfaces of the battery cell 10. In one embodiment, the pair of end plates 110 and 120, the side plates 130, and the bottom plate 140 may be connected by fastening members 20 such as bolts.

Figure 4A:
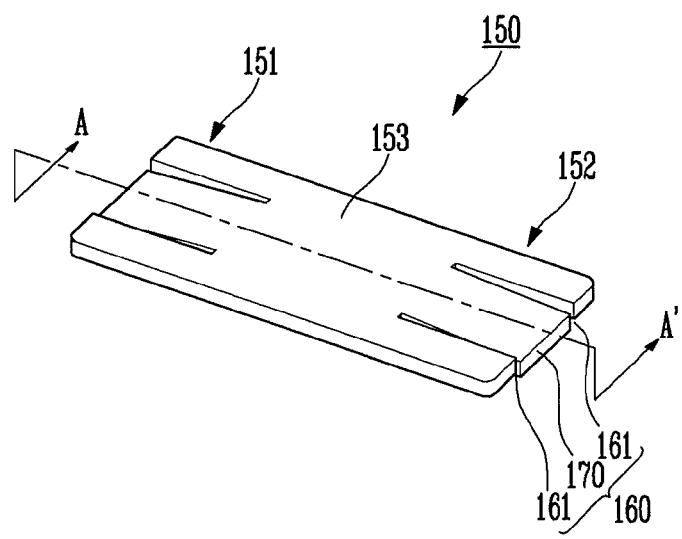
FIG. 4A is a perspective view of the terminal connecting member of FIG. 3.

FIG. 3 is an enlarged perspective view of a region "A" of FIG. 1, showing a terminal connecting member of a battery module in a connection state, according to an embodiment of the present invention. FIG. 4A is a perspective view of the terminal connecting member of FIG. 3; and FIG. 4B is a sectional view of the terminal connecting member of FIG. 4A, taken along the line A-A'.

Figure 4B:
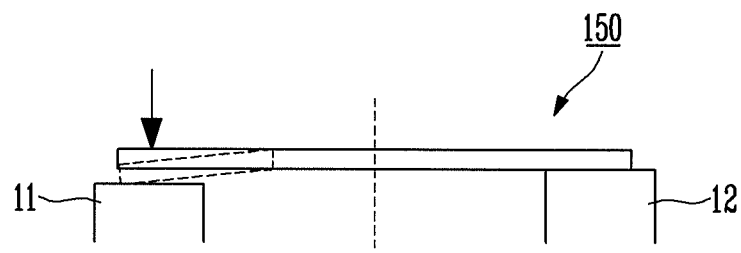
FIG. 4B is a sectional view of the terminal connecting member of FIG. 4A, taken along the line A-A'.

As shown in FIGS. 3, 4A, and 4B, the terminal connecting member 150 according to an embodiment of the present invention includes the first and second contact portions 151 and 152 configured to respectively come in surface contact with the terminal portions 11 and 12, and the body portion 153 connecting the first and second contact portions 151 and 152 to each other. In this state, the first and second contact portions 151 and 152 may be spaced apart from each other (e.g., spaced apart at a predetermined interval), and respectively come in contact with the terminal portions 11 and 12 of first and second battery cells 10a and 10b of the plurality of battery cells 10. The body portion 153 may maintain the spacing distance between the first and second contact portions 151 and 152. That is, end portions of the first and second contact portions 151 and 152 are connected to each other by the body portion 153.

A slit portion 160 configured with a pair of slits 161 may be formed in one or both of the first and second contact portions 151 or 152. The slit 161 is a slit cut away from one point to the other end portion of the first or second contact portion 151 or 152, i.e. the end portion of the first or second contact portion 151 or 152 opposite the body portion 153. The pair of slits 161 may be cut away in parallel and may have a same length. The pair of slits 161 may be formed at a position corresponding to the terminal portion 11 or 12, and a width of the slit 161 may be selected such that the terminal connecting member 150 can be welded to the terminal portion 11 or 12 by providing a laser beam to the slit 161.

The terminal portions 11 and 12 may be made of aluminum, copper, or the like, and the terminal connecting member 150, in one embodiment, may be made of aluminum. The battery cell 10 according to an embodiment of the present invention generates high current, and, therefore, the terminal portions 11 and 12 and the terminal connecting member 150 may be provided to have a strength (e.g., a predetermined strength) such that the high current stably flows. That is, the terminal connecting member 150 is provided with a solid structure to have the strength, but may partially have flexibility due to the slit portion 160. In one embodiment, a terminal contact portion 170 positioned between the pair of slits 161 may have elasticity to easily overcome a step difference between the terminal portions 11 and 12 of the adjacent battery cells 10. Thus, the terminal connecting member 150 may come in close surface contact with the terminal portions 11 and 12 of the adjacent battery cells 10 due to the elasticity of the terminal contact portion 170 of the slit portion 160, thereby improving the adhesion between the terminal connecting member 150 and the terminal portions 11 and 12.

As shown in FIG. 4B, when one of adjacent terminals is a positive electrode terminal 11 and the other terminal is a negative electrode terminal 12, the positive and negative electrode terminals 11 and 12 may be electrically connected to each other by the terminal connecting member 150. The terminal connecting member 150 includes the first and second contact portions 151 and 152, and the slit portion 160 and the terminal contact portion 170 may be formed at a position corresponding to the terminal portion 11 or 12 in the first or second contact portion 151 or 152. The plurality of battery cells 10 are aligned to face each other, and a step difference may be generated between the terminal portions 11 and 12. In the terminal connecting member 150, the terminal contact portion 170 is pressed downward, or may be pressed upward, to be connected to the terminal portion 11 or 12 by coming in surface contact with the terminal portion 11 or 12. Thus, the step difference may be overcome by the elasticity of the terminal contact portion 170.

As described above, the terminal connecting member 150 may have the strength and, simultaneously, the terminal contact portion 170 may have the elasticity due to the slit portion 160. The terminal contact portion 170 may be easily bent by an external force to be electrically connected to the terminal portion 11 or 12 by coming in close surface contact with the terminal portion 11 or 12. Although it is illustrated in FIGS. 3 and 4A that, in one embodiment, the slit portions 160 are formed in both the first and second contact portions 151 and 152, in another embodiment, the slit portion 160 may be formed in only one of the first or second contact portions 151 and 152.

Figure 5A:
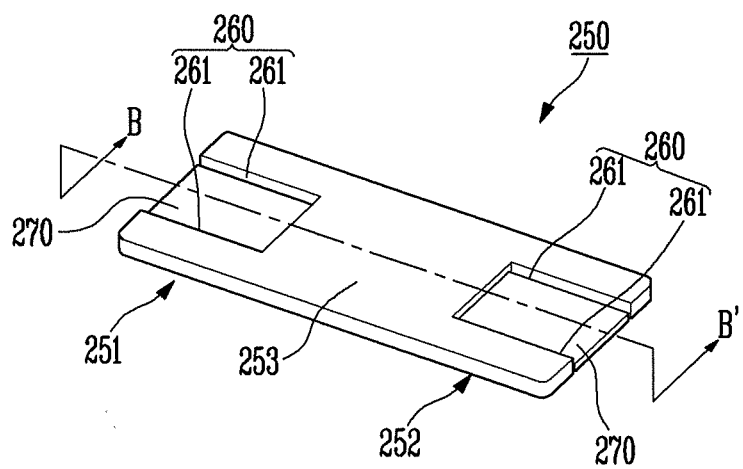
FIG. 5A is a perspective view of a terminal connecting member according to another embodiment of the present invention.
Figure 5B:
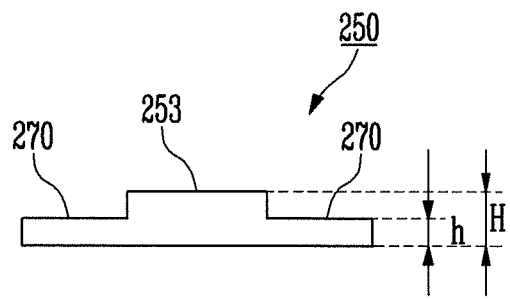
FIG. 5B is a sectional view of the terminal connecting member of FIG. 5A, taken along the line B-B'.

FIG. 5A is a perspective view of a terminal connecting member according to another embodiment of the present invention; and FIG. 5B is a sectional view of the terminal connecting member of FIG. 5A, taken along the line B-B'.

As shown in FIGS. 5A and 5B, a terminal connecting member 250 according to another embodiment of the present invention includes first and second contact portions 251 and 252, a body portion 253 connecting the first and second contact portions 251 and 252, and a slit portion 260 having a pair of slits 261 formed in one or both of the first and second contact portions 251 and 252. A thickness "h" of a terminal contact portion 270 between the pair of slits 261 may be less than a thickness "H" of a portion of the first or second contact portion 251 or 252 adjacent thereto. The terminal contact portion 270 may be pressed downward, or upward, to be electrically connected to the terminal portion 11 or 12 by coming in surface contact with the terminal portion 11 or 12. In this state, because the terminal contact portion 270 is formed thin, the elasticity of the terminal contact portion 270 is increased, such that a force with which the terminal contact portion 270 may be pressed downward is decreased.

Although it is illustrated in FIG. 5A that, in one embodiment, the slit portion 260 is formed in both the first and second contact portions 251 and 252, in another embodiment, the slit portion 260 may be formed in only one of the first or second contact portions 251 and 252.

Figure 6:
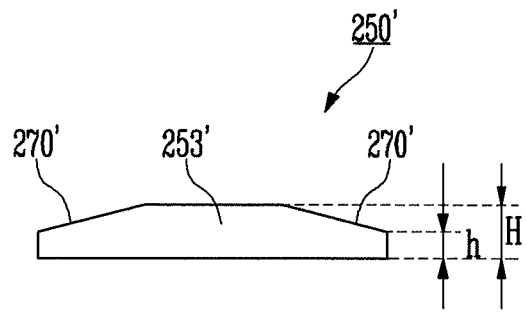
FIGS. 6 and 7 are sectional views of terminal connecting members according to further embodiments of the present invention, taken along a line corresponding to the line B-B' of FIG. 5A.
Figure 7:
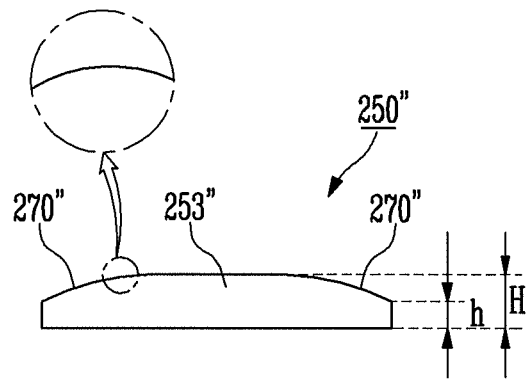

As shown in FIGS. 6 and 7, in terminal connecting members 250' and 250" according to further embodiments of the present invention, a terminal contact portion 270' or 270" may be formed such that a thickness of the terminal contact portion 270' or 270" decreases from a region adjacent to a body portion 253' or 253" to an end portion of the terminal contact portion 270' or 270". In this state, an upper surface of the terminal contact portion 270' may be inclined, as shown in FIG. 6, or an upper surface of the terminal contact portion 270" may be curved, as shown in FIG. 7.

However, the upper surface of the terminal contact portion is not limited to the inclined form shown in FIG. 6 or the curved form shown in FIG. 7, but may have any of various other suitable forms such that the elasticity of the terminal contact portion is increased.

Figure 8A:
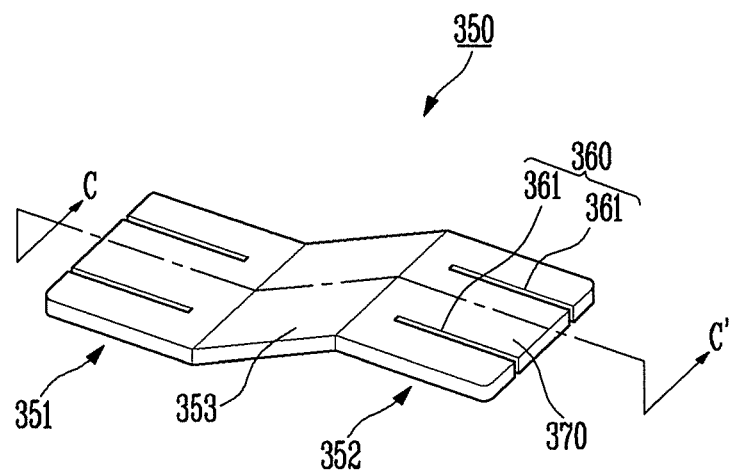
FIG. 8A is a perspective view of a terminal connecting member according to another embodiment of the present invention.
Figure 8B:
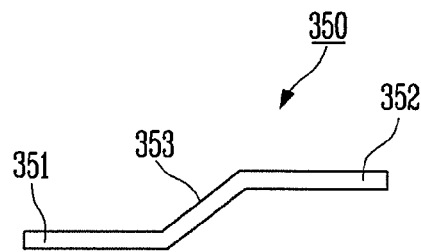
FIG. 8B is a sectional view of the terminal connecting member of FIG. 8A, taken along the line C-C'.

FIG. 8A is a perspective view of a terminal connecting member according to another embodiment of the present invention; and FIG. 8B is a sectional view of the terminal connecting member of FIG. 8A, taken along the line C-C'.

As shown in FIGS. 8A and 8B, in a battery module according to another embodiment of the present invention, a terminal connecting member 350 includes first and second contact portions 351 and 352 spaced apart from each other to respectively come in surface contact with the terminal portions 11 and 12, and a stepped body portion 353 configured to allow heights of the first and second contact portions 351 and 352 to be different from each other.

The stepped portion 353 may be formed by bending a central portion or end portions of a body portion of the terminal connecting member 350 such that the heights of the first and second contact portions 351 and 352 are different from each other, and a slit portion 360 having a pair of slits 361 and a terminal contact portion 370 between the pair of slits 361 may be further formed in one or both of the first and second contact portions 351 or 352 such that the first and second contact portions 351 and 352 may have elasticity to be easily welded to the terminal portion 11 or 12.

In one embodiment, the height of the stepped portion 352 may be formed corresponding to a step difference between the terminal portions 11 and 12, such that the terminal portions 11 and 12 and the terminal connecting portion 350 can be closely connected without applying any external force.

Although it is illustrated in FIG. 8A that, in one embodiment, the slit portion 360 is formed in both the first and second contact portions 351 and 352, in another embodiment, the slit portion 360 may be formed in only one of the first or second contact portions 351 and 352.

Figure 9A:
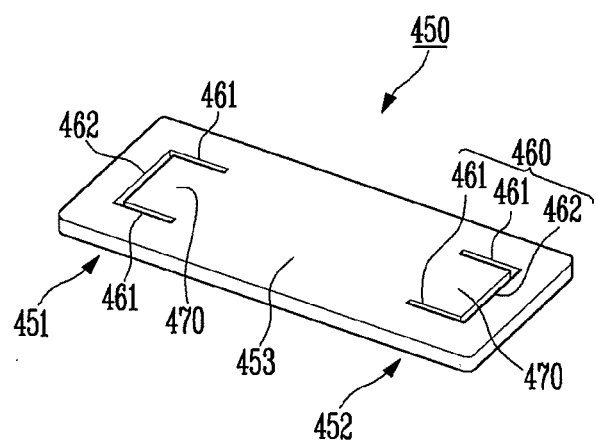
FIGS. 9A and 9B are perspective views of terminal connecting members according to another embodiment of the present invention.
Figure 9B:
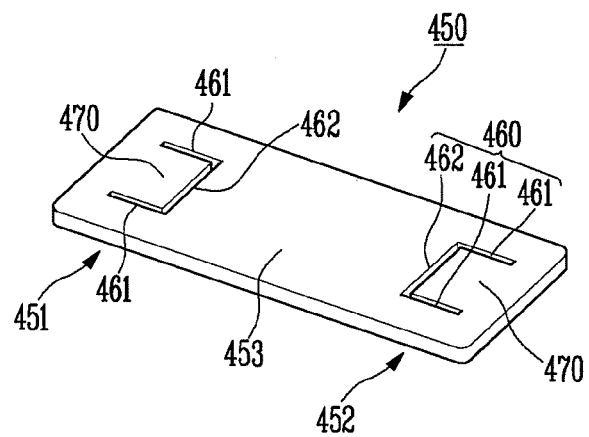

FIGS. 9A and 9B are perspective views of terminal connecting members according to another embodiment of the present invention.

As shown in FIGS. 9A and 9B, in a battery module according to another embodiment of the present invention, a terminal connecting member 450 may be coupled to the terminal portions 11 and 12 of adjacent battery cells 10 to electrically connect the battery cells 10 to each other. The terminal connecting member 450 may include first and second contact portions 451 and 452 connected through a body portion 453 and spaced apart from each other to respectively come in surface contact with the terminal portions 11 and 12, and a slit portion 460 configured to include two parallel slits 461 formed in parallel to each other at one side of the first or second contact portion 451 or 452, and a connection slit 462 configured to connect ends of the two parallel slits 461 to each other and define a terminal contact portion 470 between the two parallel slits 461.

The parallel slits 461 may be formed in parallel to each other with a same length at a side of the first or second contact portion 451 or 452. In this state, ends of the parallel slits 461 may be connected to each other by the connection slit 462. The shape of the slit portion 460 may be configured as a "[" shape or a "]" shape depending on a connection position of the connection slit 462. However, the shape of the slit portion 460 is not limited to the "[" or "]" shapes.

Although it is illustrated in FIGS. 9A and 9B that, in one embodiment, the slit portion 460 is formed in both the first and second contact portions 451 and 452, the present invention is not limited thereto. For example, in another embodiment, the slit portion 460 may be formed in only one of the first or second contact portions 451 and 452.

As described above, in the battery module according to one or more embodiments of the present invention, a step difference between the terminals of adjacent battery cells is overcome by the elasticity of the terminal contact portion formed between the pair of slits formed in the terminal connecting member, such that the plurality of battery cells can be closely coupled, thereby improving the safety and quality of the battery module.

While some exemplary embodiments of the present invention have been disclosed herein, and although specific terms are employed, they are used and are to be interpreted in a generic and descriptive sense only and not for purposes of limitation. In some instances, as would be apparent to one of ordinary skill in the art, features, characteristics, and/or elements described in connection with a particular embodiment may be used in combination with features, characteristics, and/or elements described in connection with other embodiments, unless otherwise specifically indicated. Accordingly, it will be understood by those of skill in the art that various changes in form and details may be made without departing from the spirit and scope of the present invention as set forth in the following claims and equivalents thereof.

What is claimed is:

1. A battery module comprising:
a plurality of battery cell, each comprising terminal portions on a first surface thereof, the plurality of battery cells being aligned in a first direction: and
a terminal connecting member configured to connect terminal portions of first and second battery cells of the plurality of battery cells that are adjacent to each other, wherein the terminal connecting member comprises;
first and second contact portions spaced apart from each other to respectively come in surface contact with the terminal portions of the first and second battery cells: and
a body portion connecting the first and second contact portions to each other,
wherein the terminal connecting member further comprises a slit portion including a pair of slits in at least one of the first or second contact portions,
wherein a terminal contact portion positioned between the pair of slits has a thickness less than that of the first or second contact portion adjacent to the terminal contact portion, and
wherein the thickness of the terminal contact portion decreases from a region adjacent to the body portion to an end portion of the terminal contact portion.

2. The battery module of claim 1, wherein, in the slit portion, the pair of slits are cut in parallel with a same length at a position corresponding to a terminal portion of the terminal portions of the first and second battery cells.

3. The battery module of claim 1, wherein an upper surface of the terminal contact portion is curved.

4. The battery module of claim 1, wherein an upper surface of the terminal contact portion is inclined.

5. The battery module of claim 1, wherein the terminal connecting member and a terminal portion of the terminal portions of the first and second battery cells are welded to each other at the slits by a laser beam.

6. The battery module of claim 1, wherein the terminal connecting member further comprises a stepped portion wherein a portion of the body portion is bent such that heights of the first and second contact portions are different from each other.

7. A battery module comprising:
a plurality of battery cells, each comprising terminal portions on a first surface thereof, the plurality of battery cells being aligned in a first direction ; and
a terminal connecting member configured to connect terminal portions of first and second battery cells of the plurality of battery cells that are adjacent to each other, wherein the terminal connecting member comprises:
first and second contact portions spaced apart from each other to respectively come in surface contact with the terminal portions of the first and second battery cells; and
a body portion connecting the first and second contact portions to each other, and
wherein the terminal connecting member further comprises a slit portion including two parallel slits and a connection slit connecting ends of the two parallel slits in at least one of the first or second contact portions.

8. The battery module of claim 7, further comprising a housing configured to accommodate the plurality of battery cells therein.

9. The battery module of claim 8, wherein the housing comprises:
a pair of end plates opposite to wide surfaces of outermost battery cells of the plurality of battery cells;

a side plate configured to support side surfaces of the battery cell, the side plate connecting the pair of end plates to each other; and a bottom plate configured to support bottom surfaces of the battery cells.

10. The battery module of claim 9, wherein the pair of end plates, the side plate, and the bottom plate are connected by fastening members.

\* \* \* \* \*